US005765206A

United States Patent [19]
Hohensee et al.

[11] Patent Number: 5,765,206
[45] Date of Patent: Jun. 9, 1998

[54] SYSTEM AND METHOD FOR EMULATING A SEGMENTED VIRTUAL ADDRESS SPACE BY A MICROPROCESSOR THAT PROVIDES A NON-SEGMENTED VIRTUAL ADDRESS SPACE

[75] Inventors: Paul H. Hohensee, Nashua, N.H.; David Dice, Foxboro, Mass.; Robert G. Vandette, Andover, Mass.; David L. Reese, Westborough, Mass.

[73] Assignee: Sun Microsystems, Inc., Palo Alto, Calif.

[21] Appl. No.: 608,571

[22] Filed: Feb. 28, 1996

[51] Int. Cl.$^6$ .................................................. G06F 12/10
[52] U.S. Cl. ................................................ 711/203; 395/500
[58] Field of Search ................................. 395/412, 416, 395/417, 418, 419, 500, 800

[56] References Cited

U.S. PATENT DOCUMENTS

| | | | |
|---|---|---|---|
| 5,144,551 | 9/1992 | Cepulis | 711/163 |
| 5,440,710 | 8/1995 | Richter et al. | 711/207 |
| 5,481,684 | 1/1996 | Richter et al. | 395/388 |
| 5,539,899 | 7/1996 | Huynh et al. | 711/171 |
| 5,574,927 | 11/1996 | Scantlin | 395/800.41 |

OTHER PUBLICATIONS

John L. Hennessy and David A. Patterson. Computer Architecture: A Quantitative Approach. Second Ed. Morgan Kaufmann Publishers, Inc. San Francisco, CA., 1996.

*Primary Examiner*—Eddie P. Chan
*Assistant Examiner*—Kevin Verbrugge
*Attorney, Agent, or Firm*—Richard Jordan

[57] ABSTRACT

A processor processes a segmented to linear virtual address conversion instruction to convert segmented virtual addresses in a segmented virtual address space to a linear virtual address in a linear virtual address space. The segmented virtual address space comprises a plurality of segments each identified by a segment identifier, each segment comprising at least one page identified by a page identifier. The linear virtual address space includes a plurality of pages each identified by a page identifier. In processing the segmented to linear virtual address conversion instruction, the processor uses a plurality of segmented to linear virtual address conversion descriptors, each associated with a page in the segmented virtual address space, each segmented to linear virtual address conversion descriptor identifying the page identifier of one of the pages in the linear virtual address space. The segmented to linear virtual address conversion instruction includes a segmented virtual address identifier in the segmented virtual address space. In processing the segmented to linear virtual address conversion instruction, the processor uses the segmented virtual address identifier in the segmented to linear virtual address conversion instruction to select one of the segmented to linear virtual address conversion descriptors. After selecting a segmented to linear virtual address conversion descriptor, the processor uses the page identifier of the linear virtual address space from the selected segmented to linear virtual address conversion descriptor and the segmented virtual address identifier in the segmented to linear virtual address conversion instruction in generating a virtual address in the linear virtual address space.

45 Claims, 10 Drawing Sheets

| CACHE SIZE REG 80 | | | | | CACHE ENTRY INDEX REG 82 | |
|---|---|---|---|---|---|---|

CACHE DATA INPUT REG 81

| SEG VIRT ADRS TAG 90 | CONTEXT ID 91 | P 95 | W 96 | SEG. REG. NO. 92 | SVA PAGE ADRS (LO ORDER) 93 | VIRT ADRS PAGE LMT 94 |
|---|---|---|---|---|---|---|

FAULT STATUS REG 83

ACCESS EXCEPTION REG 84

| SEG VIRT ADRS TAG 100 | CONTEXT ID 101 | P 102 | W 103 | SEG. REG. NO. 104 |
|---|---|---|---|---|

ACCESS EXCEPTION SEG VIRT ADRS REG 85

*FIG. 4*

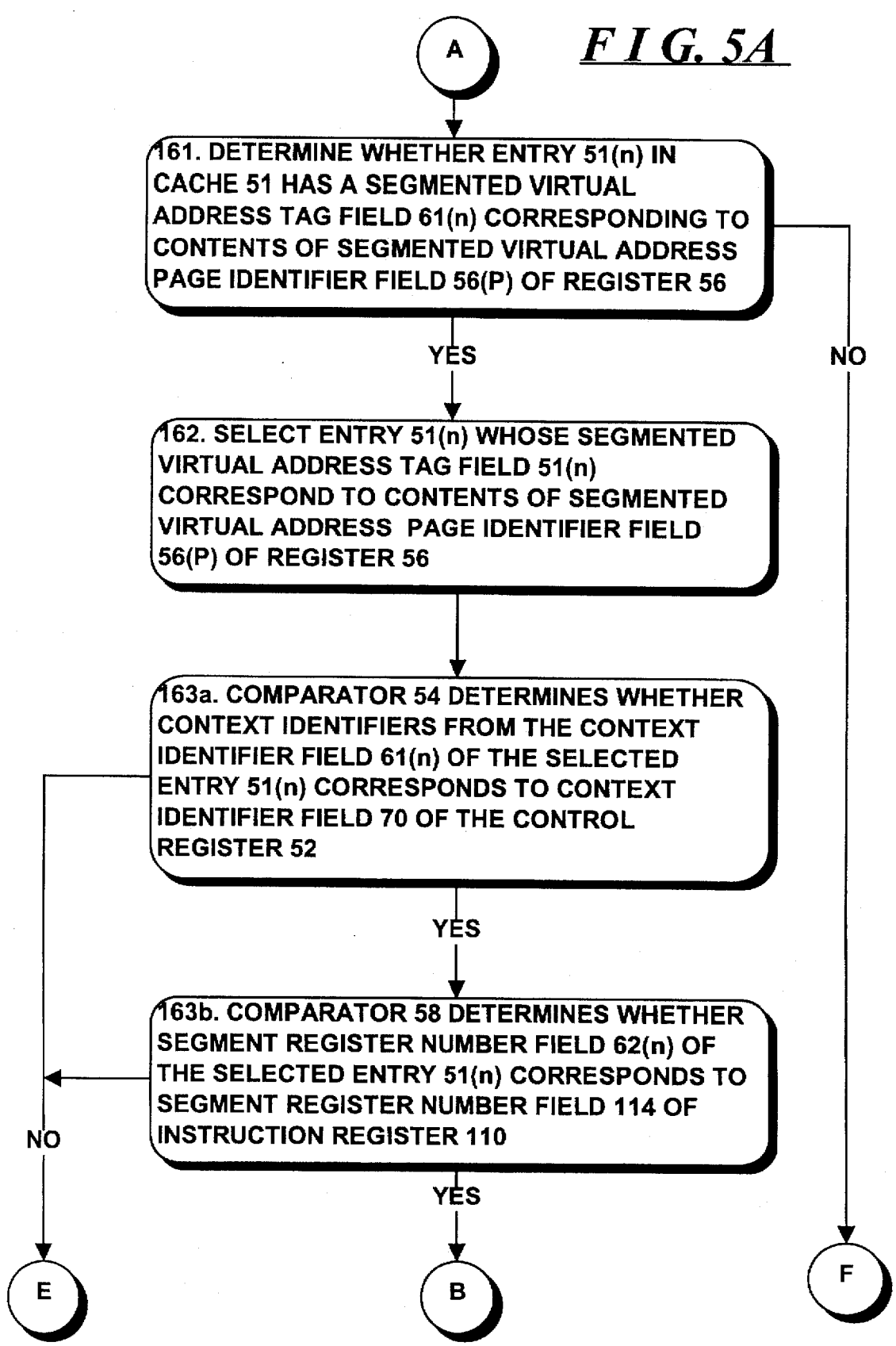

5,765,206

SYSTEM AND METHOD FOR EMULATING A SEGMENTED VIRTUAL ADDRESS SPACE BY A MICROPROCESSOR THAT PROVIDES A NON-SEGMENTED VIRTUAL ADDRESS SPACE

FIELD OF THE INVENTION

The invention relates generally to the field of digital computer systems, and more particularly to systems and methods for facilitating the efficient emulation of a segmented virtual address space by a microprocessor that provides a non-segmented, linear virtual address space.

BACKGROUND OF THE INVENTION

Digital computers process a variety of diverse types of programs, with each program including a series of instructions that enable the computer to perform specific operations in connection with specific elements of data. A variety of types of processors are available for use in digital computer systems, with each type of processor being constructed in accordance with an architecture which describes, inter alia, the set of instructions that a processor constructed in accordance with the architecture is expected to execute, the format(s) of the various instructions, the types and formats of data which may be processed, definitions for various registers that may be used during instruction processing, how information in the computer's memory will be accessed and how a processor constructed in accordance with the architecture is to handle exception conditions which may be detected during instruction processing.

It is often desirable to enable one type of processor, as an "emulated processor," to be emulated by another type of processor, as a "host processor." A host processor generally emulates an emulated processor by processing programs which have been written for the emulated processor, to generate an output that effectively corresponds to the output that would be generated by the emulated processor. Generally, emulation is accomplished by translating a program generated for execution by an emulated processor (an "original" program) into a program which may be processed by a host processor (a "translated" program). This translation process may include, for example, generating from instructions and other elements of the original program, instructions and other elements which are based on the host processor's architecture thereby to provide the translated program. The translation may be performed by, for example, the host processor itself, by another processor in the same computer system or by another computer system and made available to the host processor which is to process the program, under control of a translation program. In performing the translation, each instruction or sequences or various groups of instructions in the original program (that is, the program based on the emulated processor's architecture) may be translated into one or a series or group of instructions for processing by the host processor. The translation process is typically performed for all or selected portions of an original program when the processor begins processing the original program, although it will be appreciated that an instruction or group of instructions of the original program may be translated as the processing proceeds. In addition, if the emulated processor's data formats are not directly useable by the host processor, the data may be processed to convert it from the emulated processor's formats to formats usable by the host processor.

As noted above, an architecture definition includes a description of how a processor constructed in accordance with the architecture accesses information in the computer's memory. To simplify management of the memory for program developers, and to ensure that, when the microprocessors process a plurality of programs concurrently, the programs do not interfere with each other, modern microprocessors and operating systems provide a "context" for each program, with the various contexts defining respective "virtual address spaces." When a program needs to access a storage location in memory, it (the program) will provide a virtual address in the virtual address space to the microprocessor (more typically to a memory management unit which is associated with the microprocessor), which determines the actual physical address of the location in the memory which corresponds to the virtual address in the virtual address space. In addition to performing the virtual to physical address conversion operation, the memory management unit will perform checking operations to verify that the program can perform the requested accessing operation in connection with the location.

In some microprocessors, illustratively those of Intel Corporation's x86 family of microprocessors, which currently includes its 8086, 8088, 80286, 80386, 80486 and "Pentium" lines of microprocessors, the virtual address space is segmented, that is, an address provided by a program defines one of a plurality of segments, with the various segments occupying various regions of a single "segmented" virtual address space. Although a single virtual address space is provided, only the virtual addresses that represent locations in the various segments can be accessed. In other microprocessors, the virtual address space is not segmented, but instead any address may represent a location in the virtual address space. A problem arises if it is desired to enable a microprocessor which provides for a non-segmented "linear" virtual address space to emulate a microprocessor, such as Intel's x86 family, which provides for a segmented virtual address space, since the microprocessors do not handle memory management in a similar manner.

SUMMARY OF THE INVENTION

The invention provides a new and improved system and method for facilitating the efficient emulation of a segmented virtual address space by a microprocessor that provides a linear virtual address space.

In brief summary, the invention provides a processor that processes a single segmented to linear virtual address conversion instruction to convert segmented virtual addresses in a "segmented" virtual address space to a linear virtual address in a "linear" virtual address space. The segmented virtual address space comprises a plurality of segments each identified by a segment identifier, each segment comprising at least one page identified by a page identifier. The linear virtual address space includes a plurality of pages each identified by a page identifier. In processing the segmented to linear virtual address conversion instruction, the processor uses a plurality of segmented to linear virtual address conversion descriptors, each associated with a page in the segmented virtual address space, each segmented to linear virtual address conversion descriptor identifying the page identifier of one of the pages in the linear virtual address space. The segmented to linear virtual address conversion instruction includes a segmented virtual address identifier in the segmented virtual address space. In processing the segmented to linear virtual address conversion instruction, the processor uses the segmented virtual address identifier in the segmented to linear virtual address conversion instruction to select one of the segmented to linear virtual address conversion descriptors. After selecting a segmented to linear virtual address conversion descriptor, the processor uses the page identifier of the linear virtual address space from the selected segmented to linear virtual address conversion descriptor and the segmented virtual address identifier in the segmented to linear virtual address conversion instruction in generating a virtual address in the linear virtual address space. Thus, by processing the single segmented to linear virtual address conversion instruction, the processor can generate a virtual address in the linear virtual address space from a virtual address in the segmented virtual address space.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4 is a diagram illustrating the structure of a number of the registers useful in the segmented virtual address emulator depicted in FIG. 1; and FIG. 5 and 5A–E are a flow diagram that depicts operations performed by the segmented virtual address emulator in converting segmented virtual addresses to linear virtual addresses.

DETAILED DESCRIPTION OF AN ILLUSTRATIVE EMBODIMENT

Figure 1:
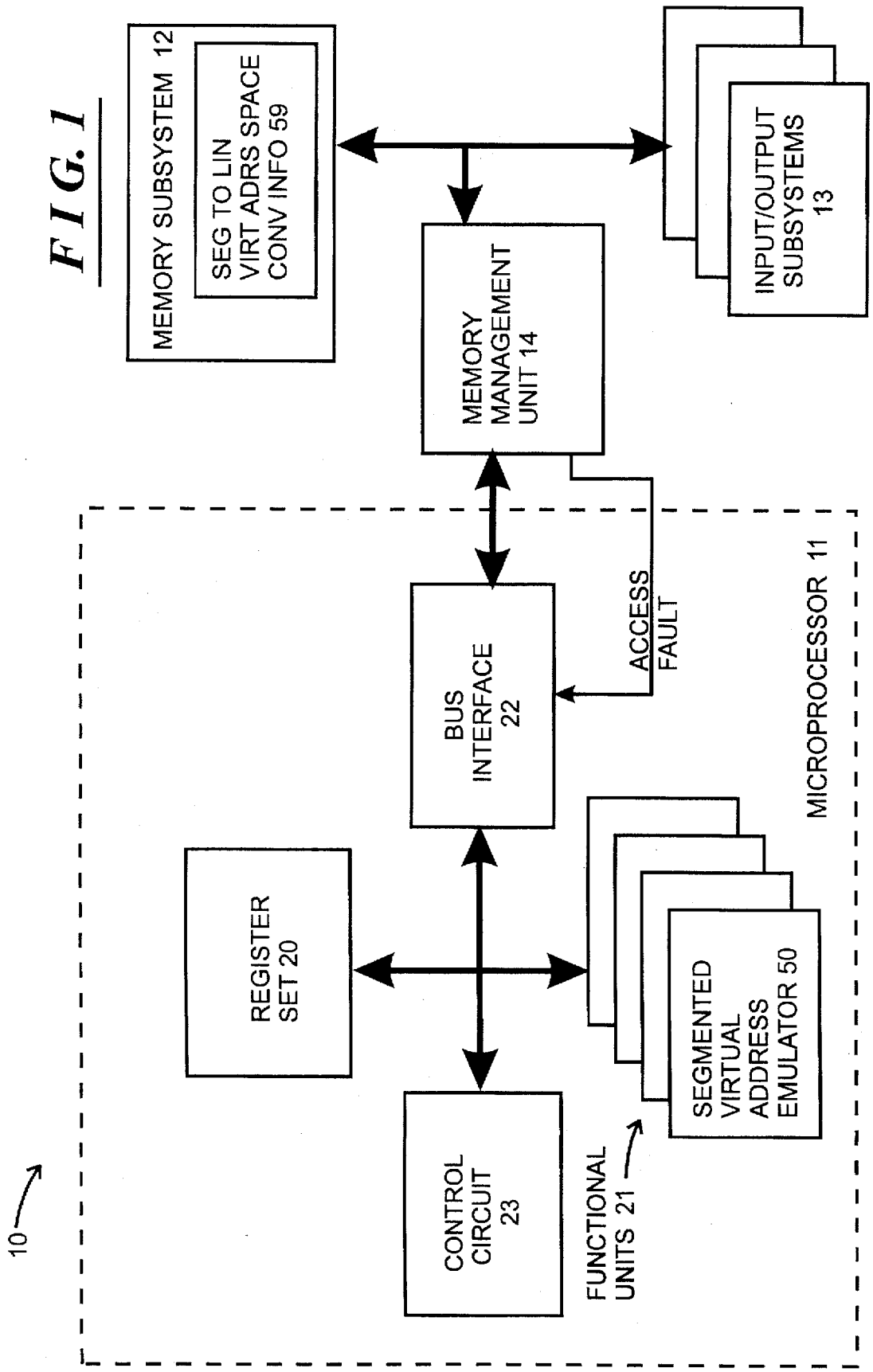
FIG. 1 is a functional block diagram depicting a digital computer system including a segmented virtual address emulator constructed in accordance with the invention.

FIG. 1 is a functional block diagram of a digital computer system 10 including a segmented virtual address emulator 50 constructed in accordance with the invention. With reference to FIG. 1, the digital computer system 10 includes a microprocessor 11 which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"). The microprocessor 11 generally includes a number of elements, including a register set 20, one or more functional units 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

In addition, in accordance with the invention, one of the functional units 21 provided by the microprocessor 11, namely a segmented virtual address emulator 50, processes a segmented to linear virtual address conversion instruction which may be provided by a program to convert virtual addresses in a segmented virtual address architecture to virtual addresses in a linear virtual address architecture, as will be described below. The segmented virtual address emulator 50, in one embodiment, facilitates the efficient emulation of programs associated with a segmented virtual address space, such as the segmented virtual address space provided by microprocessors comprising Intel Corporation's x86 family of microprocessors (which currently include Intel's 8086, 8088, 80286, 80386, 80486 and "Pentium" lines of microprocessors), which emulation is performed by a microprocessor, such as microprocessor 11, which uses a non-segmented, or "linear," virtual address space. The segmented virtual address space emulation, in turn, assists in facilitating the efficient emulation of programs that are written for microprocessors of the x86 family by microprocessor 11. The microprocessor 11 which features the linear virtual address space architecture will be referred to herein as the "host" microprocessor 11, and the microprocessor which features the segmented virtual address space architecture will be referred to herein as the "emulated" microprocessor. Similarly, program(s) written for the emulated microprocessor will be referred to herein as "original program(s)" and program(s) generated for processing by the host microprocessor in emulation of the original program(s) will be referred to herein as "translated program(s)."

Figure 2:
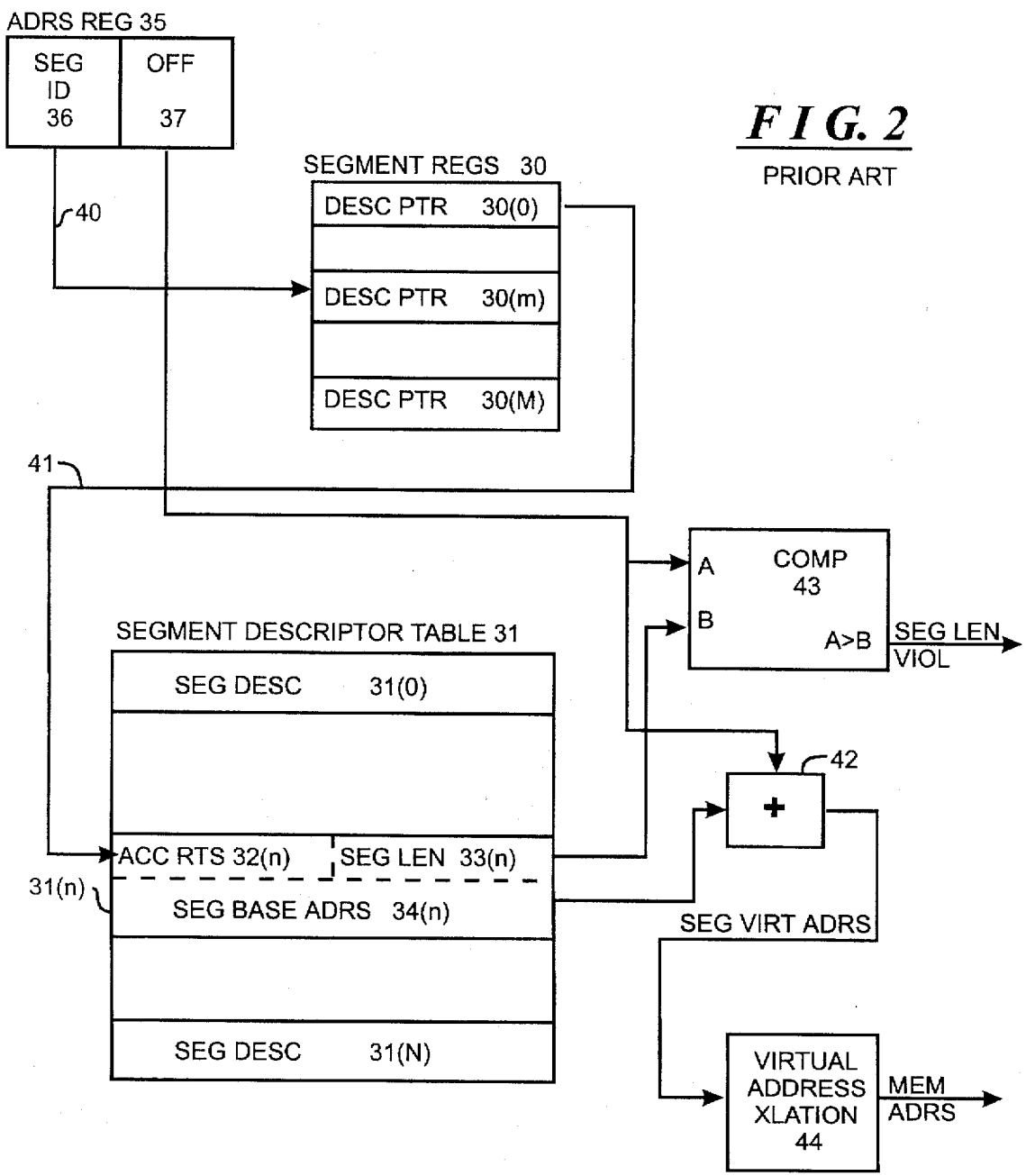
FIG. 2 is a diagram that is useful in understanding operations performed by microprocessors of a selected architecture (namely, Intel's x86 family of microprocessors) in generating a segmented virtual address, which is useful in understanding the invention.

Before proceeding further, it would be helpful to generally describe an arrangement for transforming an address in a illustrative segmented virtual address space to a physical address used accessing memory. The arrangement to be described, which is generally depicted in FIG. 2, is used in connection with programs to be processed by microprocessors which are constructed in accordance with the x86 architecture. With reference to FIG. 2, a segmented virtual address space is formed from a number of segments, each of which is associated with a segment register 30(0) through 30(M) (generally identified by reference numeral 30(m)) in segment registers 30. In the x86 architecture, for example, there are six segments (that is, M=5), including a code segment which may typically be used for storing program instruction code, a data segment which may typically be used for storing program data, a stack segment which may typically be used for storing stack(s) used by the application program, and three extra segments ("ES," "FS" and "GS") that an application program may use for other purposes, such as storing arrays or temporary data structures. In that architecture, each segment register 30(m) will be associated with a particular one of the segments, and will contain a descriptor pointer for the particular segment; thus, segment register 30(0) may contain a descriptor pointer for the code segment, segment register 30(1) may contain a descriptor pointer for the data segment, segment register 30(2) may contain a descriptor pointer for the stack segment, and other segment registers 30(3) through 30(M) will contain descriptor pointers for other segments.

Each segment register 30(m) contains a pointer that identifies one of a plurality of segment descriptors 31(0) through 31 (N) (generally identified by reference numeral 31(n)) in a segment descriptor table 31. Each segment descriptor 31(n) in the segment descriptor table 31 generally includes three fields, including an access rights field 32(n), a segment length field 33(n) and a segment base address field 34(n). The access rights field 32(n) contains access rights information, whose use will be described below. The segment base address field 34(n) contains a segment base virtual address and the segment length field 33(n) contains a segment length value, both of which serve to define a particular segment in the segmented virtual address space. The descriptors 31(n) in the respective segment descriptor tables 31 are preferably maintained by the operating system (not shown), and the particular descriptor pointer value which is maintained in each of the segment registers 30(m) is also preferably controlled by the operating system.

When a memory access operation is initiated, an address will be provided which has a structure depicted in FIG. 2, which the elements depicted on FIG. 2 will use to convert to a segmented virtual address and, from the segmented virtual address, to a physical address for accessing the memory. As shown in FIG. 2, the address (illustratively shown in an address register 35) includes a segment identifier portion 36 and an offset portion 37. The segment identifier portion 36 identifies the particular segment referred to by the address and the offset portion 37 contains an offset value into the segment. The segment identifier portion 36 is used to select a particular segment register 30(m) (as represented by arrow 40), whose contents are used as a descriptor pointer to, in turn, select the particular segment descriptor 31(n) (as represented by arrow 41) to be used in generating the segmented virtual address. The base address from the segment base address field 34(n) of the selected descriptor 31(n) is coupled to an adder 42 and the segment length value from the segment length field 33(n) is coupled to one input of a comparator 43.

The address's offset portion 37 represents an offset from the segment's base into the segment to be used in the memory access operation, and so it (the offset portion 37), along with the segment base address value from segment base address field 34(n), are coupled to respective inputs of adder 42. The adder 42 generates a value corresponding to the sum of the offset and the segment base address value, which corresponds to the segmented virtual address SEG VIRT ADRS which identifies the location in the segmented virtual address space represented by the address in register 35. The segmented virtual address is then coupled to a virtual address translator 44, which translates the segmented virtual address to a physical address in a conventional manner.

To verify that the segmented virtual address does not represent an address that is beyond the end of the segment, as defined by the segment length value in field 33(n) of the segment descriptor 31(n), it (the segment length value from field 33(n)) and the offset portion 37 are coupled to respective inputs of the comparator 43. The comparator 43, in turn, compares the offset value from the offset portion 37 to the segment length value from segment length field 33(n). If the comparator 43 determines that the offset value from the offset portion 37 is less than or equal to the segment length value from segment length field 33(n), the segmented virtual address generated by adder 42 represents a location in the segmented virtual address space that is within the segment defined by the selected descriptor 31 (n)(m). On the other hand, if the comparator 43 determines that the offset value from the offset portion 37 is greater than the segment length value from segment length field 33(n), the segmented virtual address generated by adder 42 represents a location that is beyond the end of the segment defined by the selected descriptor 31 (n)(m); in that case, the comparator 43 generates a SEG LEN VIOL segment length violation indication, which may result in, for example, a segment length violation exception and a trap to the operating system for processing.

As described above, each segment descriptor also includes an access rights field 32(n). The access rights field 32(n) generally contains access rights information which is useful in controlling memory accesses. If the access operation initiated by the application program is within the access rights indicated by the access rights field 32(n), the access operation can proceed. On the other hand, if the access operation is not within the access rights indicated by the access rights field 32(n), the access operation will not proceed, which may result in an access rights violation exception and a trap to the operating system for processing. In the x86 architecture, access rights may be used to control whether a particular segment can be accessed by an application program or only by the operating system, and whether or not an application program can store information in storage locations in particular segments, which may facilitate read-only access to a file or portions of a file by a particular application program. In addition, the access rights can be used to indicate that particular segments are "execute only," which may indicate that such segments contain program code which an application program may only retrieve and execute.

Figure 3:
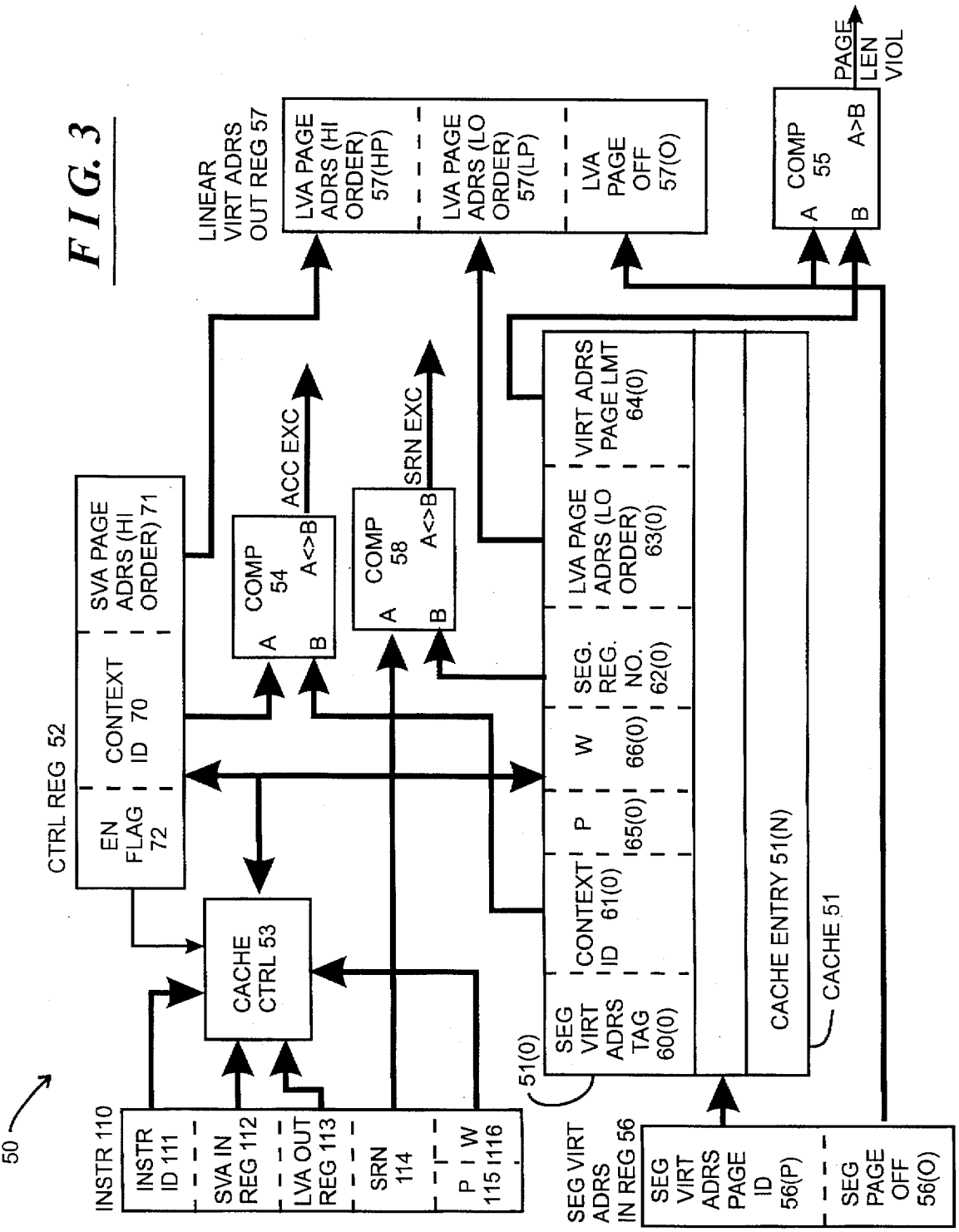
FIG. 3 is a functional block diagram of a segmented virtual address emulator, constructed in accordance with the invention, for converting segmented virtual addresses to linear virtual addresses, which is useful in the digital computer system depicted in FIG. 1.

As noted above, the invention provides a segmented virtual address emulator 50 as one of the functional units 20 to process a segmented to linear virtual address conversion instruction to facilitate the efficient emulation of a segmented virtual address space by a microprocessor which uses a nonsegmented, or "linear," virtual address space. A segmented virtual address emulator 50 in accordance with the invention is shown, in block diagram form, in FIG. 3. With reference to FIG. 3, the segmented virtual address emulator 50 includes a cache 51, a control register 52, a control circuit 53, and comparators 54 and 55 and 58. In one embodiment, the segmented virtual addresses correspond to the x86 segmented virtual addresses as described above in connection with FIG. 2, in particular the virtual addresses that are generated by adder 42 (FIG. 2). In that same embodiment, the linear virtual addresses correspond to addresses in the linear virtual address space that the microprocessor provides to the memory management unit 14 (FIG. 1). In processing the segmented to linear virtual address conversion instructions, the segmented virtual address emulator 50 will use segmented to linear virtual address space conversion information in a store 59 in memory subsystem 12 (FIG. 1) Both segmented to linear virtual address conversion instructions and segmented to linear virtual address space conversion information may be generated during the translation of a original program for execution by an emulated microprocessor into a translated program for execution by host microprocessor 11, or during processing of the translated program, as will generally be described below.

Before proceeding further, it would be helpful to describe the structure of a segmented to linear virtual address conversion instruction, the cache 51, control register 52 and control circuit 53. A segmented to linear virtual address conversion instruction is represented in FIG. 3 being as provided to the segmented virtual address emulator 50 in a register identified by reference numeral 110. A segmented to linear virtual address conversion instruction includes a number of fields, including an instruction identifier field 11 1, a segmented virtual address input register identifier field 112, a linear virtual address register output register identifier field 113, a segment register number field 114, and two flags, namely, a privileged flag 1 15 and a write enable flag 116. The instruction identifier field 111 contains a value that corresponds to the instruction operation code, which identifies the instruction as a segmented to linear address conversion instruction. The segmented virtual address input register identifier field 112 identifies one of the registers in register set 20 as a segmented virtual address input register 56, which contains a segmented virtual address. The linear virtual address output register identifier field 113 identifies one of the registers in register set 20 as a linear virtual address output register 57, into which the segmented virtual address emulator 50 is to store the linear virtual address. Generally, any of the registers in register set 20 may be selected as the segmented virtual address input register 56 and linear virtual address output register 57.

The segment register number field 114 of the instruction in register 110 contains a segment number, which identifies the segment for which the segmented virtual address in register 56 was generated.

The privileged and write flags 115 and 116 in the instruction in register 110 contain access control information used in determining whether the location represented by the segmented virtual address in register 56 can be accessed. The privileged flag 115 indicates whether the segmented to linear virtual address conversion operation initiated by the instruction in register 110 is part of a storage operation initiated by an application program or the operating system being emulated by microprocessor 11, that is, by an application program written for the x86 microprocessor family, and the operating system for which the application program was written, which is also a program written for the x86 microprocessor family, both of which are emulated by the microprocessor 11. The write flag 115 indicates whether the segmented to linear virtual address conversion operation initiated by the instruction in register 110 is part of a storage operation, in which information is to be stored in the location represented by the segmented virtual address in segmented virtual address input register 56.

The cache 51 caches segmented to linear virtual address space conversion information from store 59 that is useful in processing the segmented to linear virtual address conversion instructions. The cache 51 includes a number of cache entries 51(0) through 51(N) (generally identified by reference numeral 51(n)), each of which contains an item of segmented to linear virtual address space conversion information from store 59 useful in converting a segmented virtual address for a particular page of the segmented virtual address space to a linear virtual address for a page of the linear virtual address space. Each entry 51(n) includes a number of fields, including a segmented virtual address tag field 60(n), a context identifier field 61(n), a segment register number field 62(n), a linear virtual address (low order) field 63(n), and a segmented virtual address page length register 64(n). The cache 51 essentially forms an associative memory, with entries 51(n) being used based on a comparison between a portion of the segmented virtual address stored in the segmented virtual address input register 56, in particular a segmented virtual address space page identifier portion in a field 56(P) of segmented virtual address input register 56, and the contents of the segmented virtual address tag fields 60(n) of the entries 51(n) of cache 51. As with the linear virtual address as described above, the segmented virtual address space is also divided into pages, and the page identifier portion in field 56(P) identifies the segmented virtual address space page for the virtual address in the register 56. If the contents of the segmented virtual address tag field 60(n) of an entry 51(n) correspond to the segmented virtual address space page identifier in field 56(P), the entry 51(n) is selected for use in processing the segmented to linear virtual address conversion instruction.

On the other hand, if the segmented virtual address space page identifier in field 56(P) of segmented virtual address input register 56 does not correspond to the contents of the segmented virtual address tag field 60(n) of any cache entry 51(n), a "cache miss" condition exists, in response to which the control circuit 53 may enable other components of the microprocessor 11 to retrieve appropriate information to update the cache 51. Operations performed in connection with updating the cache 51 will be described generally below.

The context identifier field 61(n) of cache entry 51(n) contains a context identifier indicating a context for which the segmented to linear virtual address conversion information in the entry 51(n) is valid. The various emulated x86 programs may be assigned various segmented virtual address spaces by the microprocessor 11, which, in turn, are assigned respective context identifier values. The context associated with the x86 program currently being emulated by the microprocessor 11 is stored in control register 52. In processing a segmented to linear virtual address conversion instruction, the contents of the context identifier field 61(n) of the selected entry 51(n) (that is, the entry 51(n) for which the contents of the segmented virtual address tag field 60(n) of an entry 51(n) correspond to the segmented virtual address space page identifier portion in field 56(P) of segmented virtual address input register 56) are compared to the current context as identified by control register 52 by comparator 54. If the comparator 54 determines that the context identifier in field 61(n) of the selected entry correspond to the current context identifier stored in the control register 52, the segmented to linear virtual address space conversion information stored in the entry 51(n) will be used in processing the segmented to linear virtual address conversion instruction.

On the other hand, if the contents of the context identifier field 61(n) do not identify the current context, the segmented to linear virtual address space conversion information stored in the entry 51(n) is not correct for segmented virtual address space for the x86 program that the microprocessor 11 is currently emulating. In that case, the comparator 54 will indicate an ACC EXC access exception condition, in response to which the control circuit 53 may enable other components of the microprocessor 11 to retrieve appropriate information for the segmented virtual address space for the x86 program that the microprocessor is currently emulating from store 59 to update the cache 51.

The segment register number field 62(n) contains a value which identifies the segment for the segmented virtual address page identifier in field 60(n). In processing a segmented to linear virtual address conversion instruction, the segment register number value from the segment register number field 114 from the instruction and the segment register number value from field 62(n) of the selected entry 51(n) are compared by comparator 58. If the comparator 58 determines that the segment register number values from fields 114 and 62(n) are the same, then the contents of the selected entry 51(n) were generated for the same segment as called for in the segmented to linear virtual address conversion instruction. On the other hand, if the comparator 58 determines that the segment register number values from fields 114 and 62(n) are not the same, then the contents of the selected entry 51(n) were not generated for the same segment as called for in the segmented to linear virtual address conversion instruction, and so the comparator 58 generates a segment register number exception indication, which may be received by the control circuit 53 and processed as described below.

As noted above, each cache entry 51(n) further includes a segmented virtual address page length field 64(n). Typically, pages of a virtual address space will all be of uniform size, but in a segmented virtual address space such as that defined by segmented virtual addresses which may be loaded register 56, portions of a page, illustratively the last page of a segment, may not be completely filled. For example, if a segment defined by a segment descriptor 31(n) has a segment length as defined in field 33(n) of the descriptor, and if the segment begins at the beginning of a page of the virtual address in the segmented virtual address space, then the last page will only define a number of locations corresponding to the remainder in the quotient of the segment length divided by the size of the segmented virtual address page. The segmented virtual address page length field 64(n) of the selected entry 51(n) identifies the number of locations in the segmented virtual address page.

To verify that the segmented virtual address in register 56 does not identify a location beyond the end of a page, the contents of the segmented virtual address page length field 64(n) and a page offset portion in a field 56(O) of the segmented virtual address register 56 are coupled to comparator 55. If the comparator 55 determines that the contents of the segmented virtual address page offset in field 56(O) are greater than the segmented virtual address page length field 64(n), the segment virtual address input register 56 identifies a location beyond the segmented virtual address space, in which case it generates a PAGE LEN VIOL page length violation indication, which the control circuit 53 can use as described below.

On the other hand, if the comparator 55 determines that the contents of the segmented virtual address page offset in field 56(O) are less than or equal to the segmented virtual address page length field 64(n), the segment virtual address input register 56 identifies a valid location in the segmented virtual address space. In that case, if, as is the case in one embodiment, the pages in the linear virtual address space are the same size as the pages of the segmented virtual address space, the contents of the segmented virtual address page offset field 56(O) of register 56 can be used in processing the segmented to linear virtual address space conversion instruction. In one embodiment, in which the page structure of the segmented virtual address space is similar to the page structure of the linear virtual address space, the segmented virtual address page offset from field 56(O) may be copied to a linear virtual address page offset field 57(0) of register 57.

In addition, each entry 51(n) includes two flags, namely, a privileged flag 65(n) and a write flag 66(n). The flags 65(n) and 66(n) of the selected cache entry 51(n) are coupled to the control circuit 53 and are used along with the privileged and write flags 115 and 116 of the instruction 110 to determine whether the conversion operation can proceed. In particular, the privileged flag 65(n) indicates whether the page of the segmented virtual address space that is represented by the contents of the entry 51(n) can be accessed by an application program (that is, an x86 application program being emulated by the microprocessor 11) or only by the operating system (that is, the x86 operating system for the x86 application program being emulated by the microprocessor 11). If the privileged flag 65(n) in the selected cache entry 51(n) is clear, indicating that the segmented virtual address space page associated with the entry 51(n) may be accessed by an x86 application program being emulated by the microprocessor 11, the segmented virtual address emulator 50 can perform the segmented to linear virtual address conversion operation initiated by the instruction in instruction register 110 regardless of the condition of the privileged flag 115 in the instruction. On the other hand, if the privileged flag 65(n) in the selected cache entry 51(n) is set, indicating that the segmented virtual address space page associated with the entry 51(n) may only be accessed by the x86 operating system being emulated by the microprocessor 11, the segmented virtual address emulator 50 can perform the segmented to linear virtual address conversion operation initiated by the instruction in instruction register 110 only if the privileged flag 115 in the instruction is also set.

The write flag 66(n) indicates whether the page of the segmented virtual address space that is represented by the contents of the entry 51(n) can be written by an x86 program being emulated by the microprocessor 11. If the write flag 66(n) in the selected cache entry 51(n) is set, indicating that the segmented virtual address space page associated with the entry 51(n) may be written by an x86 application program being emulated by the microprocessor 11, the segmented virtual address emulator 50 can perform the segmented to linear virtual address conversion operation initiated by the instruction in instruction register 110 regardless of the condition of the write flag 116 in the instruction. On the other hand, if the write flag 66(n) in the selected cache entry 51(n) is clear, indicating that the segmented virtual address space page associated with the entry 51(n) may not be written by the x86 program being emulated by the microprocessor 11, the segmented virtual address emulator 50 can perform the segmented to linear virtual address conversion operation initiated by the instruction in instruction register 110 only if the write flag 116 in the instruction is also clear.

The control register 52 includes a number of fields, including a context identifier field 70 and a linear virtual address (high order) field 71, and an enable flag 72. The context identifier field 70 contains the context identifier which identifies the current context for the x86 program being processed by the microprocessor 11. The current context identifier from the context identifier field 70 are coupled, along with the context identifier the selected entry 51(n) of the cache 51 to respective inputs of comparator 54 which, as described above, compares the contents of the entry's context identifier field 61(n) and the current context identifier in the context identifier field 70 to determine whether an ACC EXC access exception condition exists.

As noted above, the control register 52 also includes a linear virtual address (high order) field 71. In one embodiment, for each context, the high-order portion of the linear virtual addresses associated with a context which may be converted by the segmented virtual address emulator 50 does not vary, and to save space in the cache 51, the invariant high-order portion is stored in the control register 52. During processing of a segmented to linear virtual address conversion instruction, the high-order portion is copied from the linear virtual address (high order) field 71 to a high-order linear virtual address page field 57(HP) of the linear virtual address output register 57.

Finally, as noted above, the control register 52 includes an enable flag 72. The enable flag 72 may be controlled by the microprocessor 11 to, in turn, control the operation of the segmented virtual address emulator 50. If the enable flag 72 is set, the control circuit 53 is enabled to control the other components of the segmented virtual address emulator 50 to, in turn, process the segmented to linear virtual address conversion instructions issued to the segmented virtual address emulator 50. On the other hand, while the enable flag 72 is clear, the control circuit 53 is disabled from processing segmented to linear virtual address conversion instructions issued to the segmented virtual address emulator 50.

The control circuit 53 controls the operations of the various components of the segmented virtual address emulator 50. The control circuit 53 includes a number of registers, which are depicted in FIG. 4. With reference to FIG. 4, the control circuit 53 includes a cache size register 80 a cache entry data input register 81 and a cache entry index register 82, all of which are useful in connection with loading of information into the various entries 51(n) in the cache 51. The cache size register 80 contains a "last cache entry" value which identifies the number of cache entries 51(n) in the cache 51. The control circuit 53 may use the cache size value in cache size register 80 if the microprocessor control circuit 23 enables it (the control circuit 53) to load information into an entry 51(n), to verify that an entry exists to receive the information is to be loaded.

The cache entry data input register 81 includes a number of fields 90 through 96 which correspond to respective fields 60(n) through 66(n) of cache entries 51(n). In one embodiment, the contents of entries 51(n) of cache 51 may be updated using two arrangements. In one arrangement, the microprocessor control circuit 23 may provide the information to be loaded in a specific entry 51(n) to the cache entry data input register 81 and an entry identifier identifying the entry 51(n) into which the information is to be loaded; thereafter, the microprocessor control circuit 23 will enable the cache control circuit 53 to (i) use the cache size register 80 to verify that an entry 51(n) exists which corresponds to the entry identifier, and (ii) if so, load the information from the cache entry data input register 81 into the specified entry 51(n). In a second arrangement, the microprocessor control circuit 23 will also provide the information to be loaded in an entry 51(n) to the cache entry data input register 81; thereafter, the microprocessor control circuit 23 will enable the cache control circuit 53 to select a cache entry 51(n) into which the information is to be loaded, using any selected cache replacement methodology, and load the information into the selected cache entry 51(n). Suitable cache replacement methodologies are well known in the art and will not be described herein. For either arrangement, when the control circuit 53 loads information into a cache entry 51(n), it also loads a pointer to the entry 51(n) in the cache entry index register 82; thus, the cache entry index register 82 contains a value that identifies the last entry 51(n) into which information was stored.

The control circuit 53 also includes several registers which are used in connection with exception status information, including an exception status register 83, cache entry access register 84, and a fault address register 85. If an exception condition exists in connection with processing of a segmented to linear virtual address conversion instruction, the control circuit 53 loads an exception identifier identifying the type of exception into the exception status register 83. A number of exception conditions may exist, including in one embodiment:

(i) an access exception, as described above, in which the comparator 54 determines that context identifier in the field 61(n) of the selected cache entry 51(n) differs from the context identifier in field 70 of the control register 70;

(ii) a privilege violation exception, which may occur if the control circuit 53 determines that the privileged flag 65(n) of the selected cache entry 51(n) is set and the privilege flag 115 in the instruction in instruction register 110 is clear;

(iii) a write violation exception, which may occur if the control circuit 53 determines that the write flag 66(n) of the selected cache entry 51(n) is clear and the write flag 116 in the instruction in instruction register 110 is set;

(iv) a segment register number exception, in which the comparator 58 determines that the segment register number values in fields 62(n) and 114 in the selected cache entry 51(n) and instruction register 110 differ; and (v) a page length violation, in which the comparator 55 determines that the segment page offset in field 56(O) of the segmented virtual address input register 56 is greater than the segment virtual address page length field 64(n) of the selected cache entry 51(n).

Several types of exceptions may represent fatal errors in connection with processing of the program which issued the segmented to linear virtual address conversion instruction, which may lead to the microprocessor terminating processing of the program. However, if the exception is an access exception (item (i) above), the control circuit 53 can enable the microprocessor control circuit 23 to, in turn, enable a cache entry 51(n) to be loaded with appropriate information for the correct context, as described above.

To enable the microprocessor control circuit 23 to initiate loading of the cache entry, the control circuit 53 stores information in the access exception register 84 and access exception segment virtual address register 85. In particular, the control circuit 53 loads (i) the contents of the segmented virtual address tag field 60(n) of the entry 51(n) selected during processing of the segmented to linear virtual address conversion instruction into a field 100, which serves to identify the entry 51(n) which gave rise to the access exception;

(ii) the context identifier from the context identifier field 70 of the control register 70 into a field 101, which identifies the current context, which permits verification that the update information selected to be loaded into the entry 51(n) is for the correct context; and (iii) the privileged and write flags 115 and 116 and segment register number from field 114 of the segmented to linear virtual address conversion instruction into fields 102 through 104, which also permits verification that the update information selected to be loaded into the entry 51(n) have the proper information for processing of the instruction.

Figure 5:
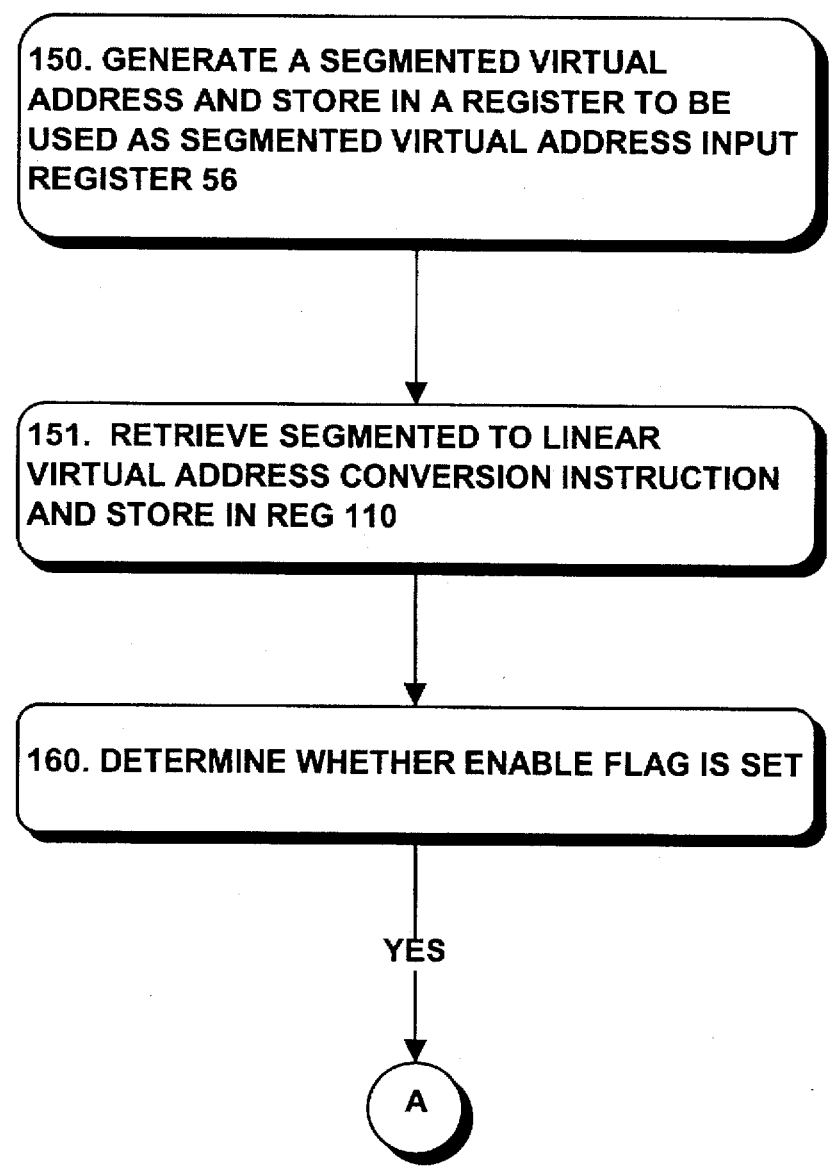
Figure 5B:
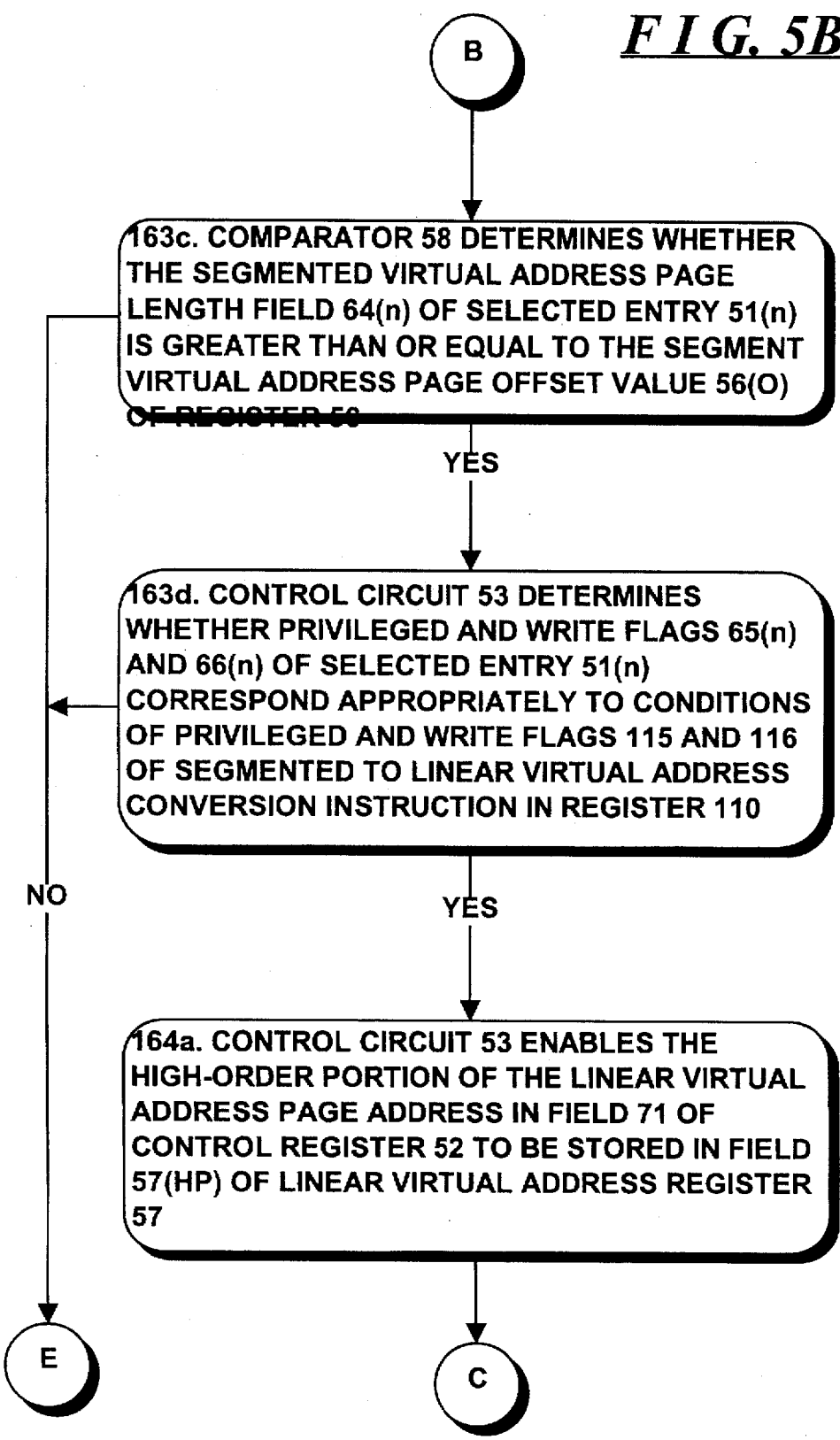
Figure 5C:
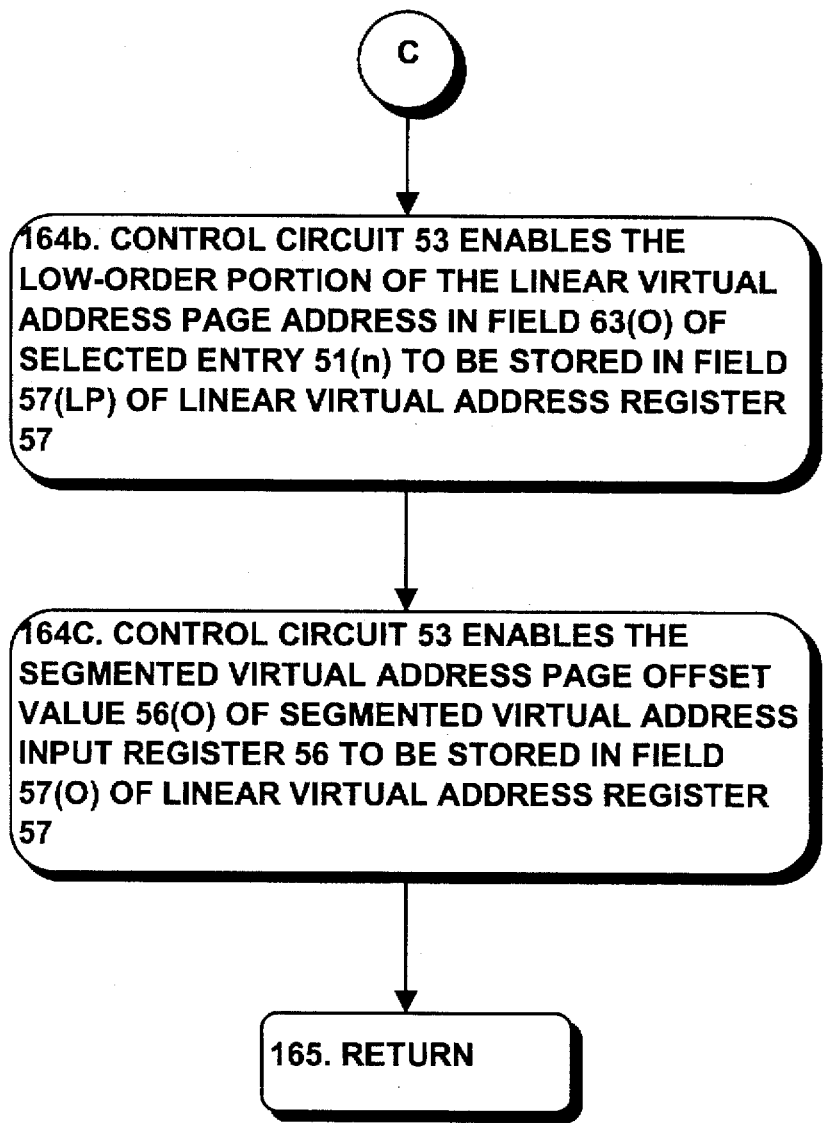
Figure 5D:
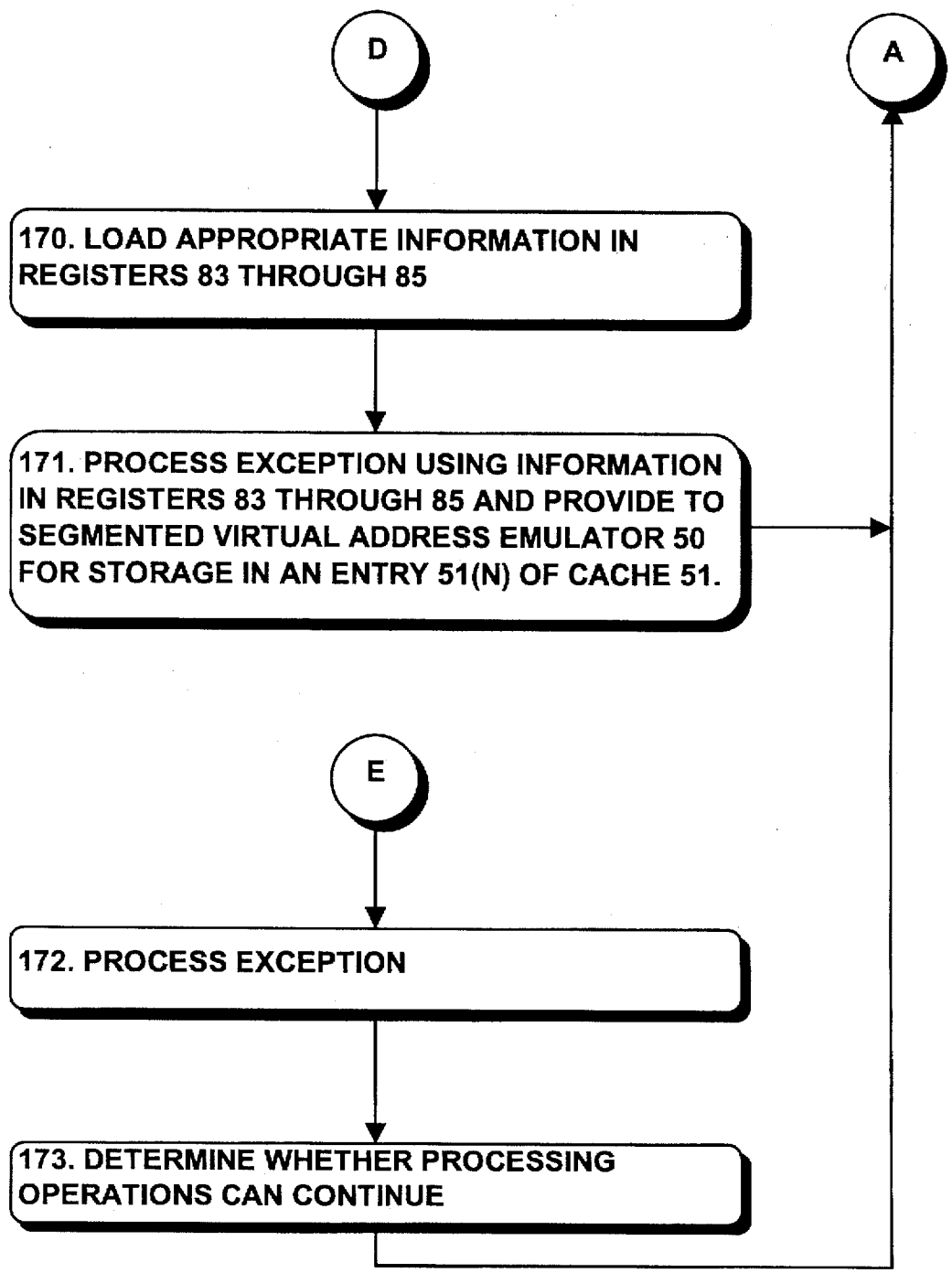
Figure 5E:
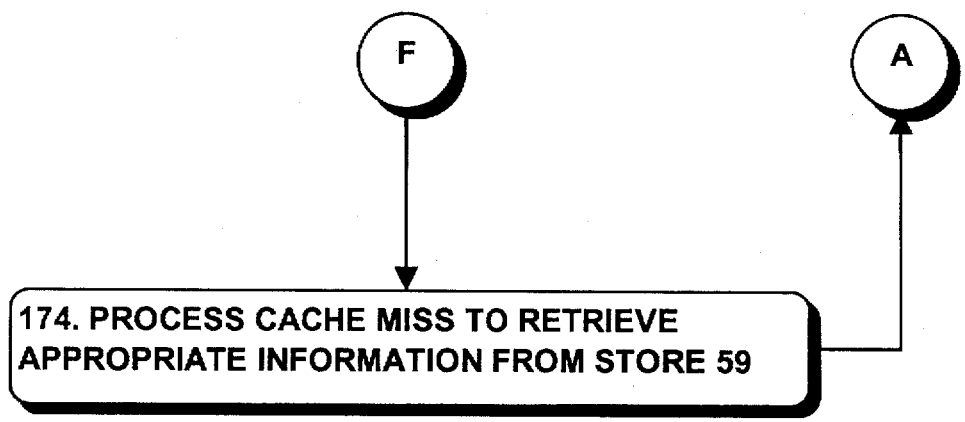

With this background, the operations performed by the control circuit 53 in connection with processing of a segmented to linear virtual address conversion instruction will be described in connection with FIG. 5. Preliminarily, if the address to be converted has a form is in the form of an address similar to that described above in connection with FIG. 2, including a segment identifier portion 36 and an offset portion 37, the microprocessor 11 performs operations described above in connection with FIG. 2 to generate a segmented virtual address (corresponding to the output of adder 42) and store it in a register in register set 20 which will later be used as the segmented virtual address input register for the segmented to linear virtual address conversion instruction (step 150). Generally, the operations performed during step 150 to generate a segmented virtual address will be performed using other functional units 21, such as adders and the like. Thereafter, the microprocessor 11 will retrieve the segmented to linear virtual address conversion instruction, which it stores in register 110 (step 151).

After receiving the instruction in register 110, if the enable flag 72 is set (step 160), the control circuit 53 determines whether an entry 51(n) in the cache 51 has a segmented virtual address tag field 60(n) corresponding to the contents of the segmented virtual address page identifier field 56(P) of the segmented virtual address input register 56 identified in the instruction in register 110 (step 161). If the control circuit 53 makes a positive determination in step 161, it selects the entry 51(n) which has a segmented virtual address tag field 60(n) corresponding to the contents of the segmented virtual address page identifier field 56(P) of register 56, which it couples to other components of the segmented virtual address emulator 50 (step 162). In particular, the control circuit 53 enables (i) the context identifiers from the context identifier field 61(n) of the selected entry 51(n) and context identifier field 70 of the control register 52 to be coupled to comparator 54 (step 163a), (ii) the segment register number values from segment register number field 62(n) of the selected entry 51(n) and segment register number field 114 of instruction register 110 to comparator 58 (step 163b), and (iii) the segmented virtual address page limit value from field 64(n) of the selected entry and the segment virtual address page offset value from field 56(O) of the segmented virtual address input register 56 to comparator 55 (step 163c).

In addition, the control circuit 53 receives the privileged and write flags from fields 65(n) and 66(n) of the selected entry for comparison with the corresponding flags 115 and 116 of the segmented to linear virtual address conversion instruction in instruction register 110 (step 163d).

As described above, if (i) the comparator 55 determines in step 163a that the context identifiers from the context identifier field 61(n) of the selected entry 51(n) and context identifier field 70 of the control register 52 have the same value, it does not generate the ACC EXC access exception indication, (ii) the comparator 58 determines in step 163b that the segment register number values from segment register number field 62(n) of the selected entry 51(n) and segment register number field 114 of instruction register 110 have the same value, it does not generate the SRN EXC segment register number exception indication, (iii) the comparator 55 determines in step 163c that the segmented virtual address page limit value from field 64(n) of the selected entry 51(n) is greater than or equal to the segment virtual address page offset value from field 56(O) of the segmented virtual address input register 56, it does not generate the PAGE LEN VIOL page length violation exception indication, and (iv) the control circuit 53 determines in step 163d that the conditions of the privileged and write flags from fields 65(n) and 66(n) of the selected entry correspond appropriately to the conditions of flags 115 and 116 of the segmented to linear virtual address conversion instruction in instruction register 110, the control circuit 53 enables (a) the contents of the high order portion of the linear virtual address page address in field 71 of the control register 52 to be stored in field 57(HP) of the linear virtual address output register 57 (step 164a), (b) the contents of the low order portion of the linear virtual address page address in field 63(n) of the selected entry to be stored in field 57(LP) of the linear virtual address output register 57 (step 164b), and (c) the contents of the segmented virtual address page offset value to be copied from field 56(O) of the segmented virtual address input register 56 to be stored in linear virtual address page offset field 57(O) of linear virtual address out register 57 (step 164c). Following step 164c, the control circuit 53 can return control to the microprocessor's control circuit 23 (step 165).

Returning to step 163a, the control circuit 53 determines in that step that the comparator 54 generated an access exception indicating that context identifiers from the context identifier field 61(n) of the selected entry 51(n) and context identifier field 70 of the control register 52 have the different values, it will sequence to step 170 to load the appropriate information in registers 83 through 85 (step 170) and enable the microprocessor's control circuit 23 to process the access exception. In processing the access exception, the microprocessor 11 may either obtain the appropriate conversion information for the segmented virtual address in register 56 from memory 12 or in the alternative it may generate the information, and provide the information to the segmented virtual address emulator 50 for storage in an entry 51(n) of cache 51 (step 171). Thereafter, the control circuit 53 will perform the segmented to linear virtual address conversion operation as described above (steps 161 through 166).

Returning to steps 163b and 163c, if the control circuit 53 determines in those steps that the comparators 55 and 58 generate the PAGE LEN VIOL page length violation indication or the SRN EXC segment register number exception, or if the control circuit determines in step 163d that the conditions of the privileged and write flags from fields 65(n) and 66(n) of the selected entry do not correspond appropriately to the conditions of flags 115 and 116 of the segmented to linear virtual address conversion instruction in instruction register 110, it (the control circuit 53) will enable the microprocessor's control circuit 23 to process the appropriate exceptions (step 172). If the microprocessor's control circuit 23 is able to correct the condition which gave rise to the exception (step 173), it will return control to the control circuit 53, after which the control circuit 53 will perform the segmented to linear virtual address conversion operation as described above (steps 161 through 166).

Returning to step 161, if the control circuit 53 determines in step 161 that the cache 51 does not contain an entry 51(n) whose segmented virtual address tag field 60(n) corresponds to the contents of the segmented virtual address page identifier field 56(P) of the segmented virtual address in register 56, it will sequence to step 174 to enable the microprocessor 11 to provide appropriate conversion information for the segmented virtual address in register 56, which it may either obtain from memory 12 or alternatively generate. Thereafter, the control circuit 53 will perform the segmented to linear virtual address conversion operation as described above (steps 161 through 166).

As described above, both segmented to linear virtual address conversion instructions, which are executed by the segmented virtual address emulator 50 (FIG. 1) and the segmented to linear virtual address space conversion information which is used by the emulator 50, may be generated during the translation of a original program to be executed by an emulated microprocessor into a translated program for execution by host microprocessor 11, or during processing of the translated program. Preliminarily, it will be appreciated that during emulation of an original program, the segment registers 30 and the segment descriptor table 31 for the original program will be emulated, which may be maintained in the register set 20 and/or in the memory subsystem 12. In addition, a correspondence will be established between the segmented virtual address space for the original program and the linear virtual address space for the context of the host microprocessor 11 in which the original program will be emulated so that each page in the segmented virtual address space (which is defined by the segmented virtual address page identifier) can be associated with a particular page in the linear virtual address space (which is defined by both the high and low-order portions of the linear virtual address page identifier).

Segmented to linear virtual address conversion instructions will be generated in response to instructions in the original program which initiate memory access operations. In generating a segmented to linear virtual address conversion instruction, initially the instruction identifier for the instruction may be loaded into field 111 (FIG. 3). As described above, an original program instruction which initiates memory access operations includes an address comprising a segment identifier and an offset value, and the segment identifier from the original program instruction will be used in the segment register number field 114 (FIG. 3) of the segmented to linear virtual address conversion instruction. In addition, the registers in register set 20 which are to serve as segmented virtual address input register 56 and linear virtual address output register 57 will be selected in a conventional manner and pointers identifying those registers will be loaded into respective fields 112 and 113. Further, the privileged and write flags 115 and 116 of the segmented to linear virtual address conversion instructions may be conditioned in response to the access rights in the field 32(n) (FIG. 2) of the segment descriptor 31(n) for the segment accessed by the original program instruction. It will be appreciated that one or more additional instructions will be provided in the translated program for execution in advance of the segmented to linear virtual address conversion instruction to generate the segmented virtual address which is to be provided in the segmented virtual address input register 56 when the segmented to linear virtual address conversion instruction is executed. These additional instructions may make use of the contents of the emulated segment registers and emulated segment descriptor table and the offset value from the address provided by the original program instruction.

The items of segmented to linear virtual address space conversion information can be generated from the emulated segment descriptor tables and the aforementioned correspondences between the segmented virtual address space and linear virtual address space. In particular, for each emulated segment descriptor in an emulated segment descriptor table, one or more items of segmented to linear virtual address space conversion information will be generated. If the segment has a length, as determined by the emulated segment length field (reference field 33(n), FIG. 2) such that it (the segment) will fit into a single page of the segmented virtual address space, only one item of segmented to linear virtual address space conversion information need be generated. On the other hand, if the segment has a length such that it will require a plurality of pages of the segmented virtual address space, a number of items of segmented to linear virtual address space conversion information will need to be generated, one item for each page.

In generating each item, the values for the segmented virtual address tag (reference field 60(n), FIG. 3) and linear virtual address field (low order) (reference field 63(n), FIG. 3) of the item will be conditioned in response to the correspondences between the segmented virtual address space and linear virtual address space. The segment register number (reference field 62(n), FIG. 3) will correspond to the segment identifier for which the emulated segment descriptor was generated. The virtual address page limit (reference field 64(n), FIG. 3) of the item will also be conditioned in response to the correspondences between the segmented virtual address space and the linear virtual address space. That is, for pages of the segmented virtual address space which are filled, the virtual address page limit field will contain a value which corresponds to the maximum number of locations in a page. On the other hand, for pages which are not filled (which may include, for example, the last page of a segment as described above), the virtual address page limit field will contain a value which corresponds to the number of locations which are actually in the page; accordingly, for the last page of a segment, the value may correspond to the remainder in the quotient of the segment length divided by the size of the segmented virtual address page. Further, the privileged and write flags (reference flags 65(n) and 66(n), FIG. 3) of the item may be conditioned in response to the access rights in the field 32(n) (FIG. 2) of the segment descriptor for the segment for which the item is generated. Finally, the context identifier (reference field 61(n), FIG. 3) may be assigned by the host microprocessor's operating system.

It will be appreciated that the invention provides a number of advantages. In particular, it provides an efficient arrangement for facilitating the emulation of a segmented virtual address space, such as that used in connection with programs written for Intel's x86 family of microprocessors, by microprocessors which utilize a non-segmented, linear virtual address space.

It will further be appreciated that a number of extensions and modifications may be made to the embodiment described above. For example, as described above, to verify that a particular entry 51(n) of cache 51 contains the segmented to linear virtual address conversion information which is associated with the correct segment, the segment register number value from segment register number field 62(n) of the entry 51(n) is compared to contents of the segment register number field 114 of the segmented to linear virtual address conversion instruction. However, the x86 architecture provides a segment register load instruction which enables a microprocessor constructed in accordance with that architecture to load a value in one of the segment registers 30(m). Since the contents of the segment register 30(m) identify the particular segment descriptor 31(n) in the segment descriptor table 31 which defines the segment associated with the segment register 30(m), an instruction to change in the value contained in a segment register may result in a change in segment.

In that case, if the microprocessor 11 emulates an x86 segment register load instruction, the segmented to linear virtual address conversion information in particular entries 51(n) of the cache 51 related to the segment whose segment register 30(m) is to be loaded by the segment register load instruction would contain invalid information. To accommodate that, in one embodiment the microprocessor 11 may emulate an x86 segment register load instruction by invalidating the entries 51(n) in cache 51 which are associated with the particular segment whose segment register 30(m) is to be loaded, by, for example, clearing the entries 51(n). In that operation, the contents of successive entries 51(n) may be examined to determine whether their segment register number fields 62(n) contain a value identifying the segment whose segment register 30(m) is to be loaded in response to the segment register load instruction.

Alternatively, each segment may be associated with a bit map (not shown) having a plurality of bits, with each bit, in turn, being associated with an entry 51(n) of cache 51. In that case, if segment register number field 62(n) of an entry 51(n) identifies a particular segment, the bit associated with the entry 51(n) will be set in the segment's bit map, with the bit associated with the entry 51(n) being cleared in the other segments' bit maps. If the microprocessor 11 emulates an x86 segment register load instruction for a particular segment register 30(m), it may use the bit map for the segment associated with the segment register 30(m) to be loaded to identify the entries 51(n) which contain segmented to linear virtual address conversion information for the segment, and which therefore are to be invalidated.

In addition, it will be appreciated that the cache 51 may be organized in accordance with any convenient cache organizational arrangement, including fully associative, direct-mapped, "n"-way set-associative (where "n" is an integer) and the like. In one particular embodiment, the cache 51 is a direct-mapped cache, in which a low-order portion of the segmented virtual address page identifier in field 56(P) of the segmented virtual address in segmented virtual address input register 56 identifies a single entry 51(n) in cache 51 whose contents are to be used in the operations described above in connection with steps 161 through 165. In those operations, if the contents of the segmented virtual address tag field 60(n) of the entry 51(n) do not correspond to the segmented virtual address page identifier in field 56(P) in register 56 (reference step 161), appropriate segmented to linear virtual address conversion information will be provided for storage in the entry 51(n) for the segmented virtual address in register 56, which may be either obtained from memory 12 or alternatively generated (reference step 174). After the appropriate segmented to linear virtual address conversion information has been provided for storage in entry 51(n), to the segmented to linear virtual address conversion operation will be performed (reference step 161 through 165).

In addition, while the host microprocessor 11 and memory management unit 14 have been depicted in FIG. 1 as comprising separate elements, with the memory management unit 14 communicating with the microprocessor through the bus interface 22, it will be appreciated that the host microprocessor 11 and memory management unit 14 may comprise a single element integrated together on one or more integrated circuit chips. If the host microprocessor 11 and memory management unit 14 are integrated together, the bus interface 22 and memory management unit 14 may, for example, be unified into a single element.

It will be further appreciated that the entire host microprocessor 11, constructed in accordance with a selected architecture (such as the aforementioned SPARC, Version 9, architecture as described in the aforementioned SPARC Architecture Manual, Version 9) further including the segmented virtual address emulator in accordance with the invention, may be emulated using a microprocessor of, for example, another architecture as provided with suitable emulation programs or microcode.

Furthermore, it will be appreciated that a microprocessor 11 including a segmented virtual address emulator in accordance with the invention can be constructed in whole or in part from special purpose hardware or one or more program-controllable devices which any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A processor for processing a segmented to linear virtual address conversion instruction to convert a segmented virtual address in a segmented virtual address space to a linear virtual address in a linear virtual address space, the segmented virtual address space comprising a plurality of segments, each segment comprising at least one segment page identified by a segmented page identifier, the linear virtual address space including a plurality of linear pages each identified by a linear page identifier, the processor using a plurality of segmented to linear virtual address conversion descriptors, each associated with a segment page, each segmented to linear virtual address conversion descriptor identifying the page identifier of one of said linear pages, the segmented to linear virtual address conversion instruction identifying a segmented virtual address in said segmented virtual address space, the segmented virtual address identifying one of said segment pages, the processor comprising:

A. a segmented to linear virtual address conversion descriptor selector element for selecting one of said segmented to linear virtual address conversion descriptors associated with one of said segment pages as identified by the segmented to linear virtual address conversion instruction; and B. a linear virtual address generator for using the page identifier of the linear virtual address space from the segmented to linear virtual address conversion descriptor selected by said segmented to linear virtual address conversion descriptor selector element and the segmented virtual address identifier in the segmented to linear virtual address conversion instruction to generate a virtual address in said linear virtual address space.

2. A processor as defined in claim 1, the processor being connected to a memory, the memory storing the segmented to linear virtual address conversion descriptors, the processor further comprising a descriptor retrieval element for retrieving from the memory the segmented to linear virtual conversion descriptor as selected by said segmented to linear virtual address conversion descriptor element for use by said linear virtual address generator.

3. A processor as defined in claim 2 in which said processor further comprises a cache for caching segmented to linear virtual address conversion descriptors retrieved by said descriptor retrieval element, the segmented to linear virtual address conversion descriptor selector element initially determining whether the cache contains a segmented to linear virtual address conversion descriptor associated with the segment page identified by the segmented to linear virtual address conversion instruction and, if so, selecting the segmented to linear virtual address conversion descriptor.

4. A processor as defined in claim 3 in which said segmented to linear virtual address conversion descriptor selector element, if it determines that the cache does not contain a segmented to linear virtual address conversion descriptor associated with the segment page identified by the segmented to linear virtual address conversion instruction, initiates a retrieval operation to retrieve from the memory the segmented to linear virtual conversion descriptor as selected by said segmented to linear virtual address conversion descriptor element for use by said linear virtual address generator.

5. A processor as defined in claim 1 in which said segmented to linear virtual address conversion instruction is to be used in an access operation in connection with a page in the linear virtual address space, said segmented to linear virtual address conversion instruction including access rights information, and further in which each segmented to linear virtual address conversion descriptor includes access rights requirement indicia, the processor further including an access rights verifier for verifying that the access rights information in said segmented to linear virtual address conversion instruction conforms to the access rights requirement indicia.

6. A processor as defined in claim 5 in which said processor further includes an exception handler for performing selected recovery operations if the access rights verifier determines that the access rights information in said segmented to linear virtual address conversion instruction does not conform to the access rights requirement indicia in said selected segmented to linear virtual address conversion descriptor.

7. A processor as defined in claim 5 in which said access rights information in said segmented to linear virtual address conversion instruction indicates one of a plurality of access privilege levels, and said access rights requirement indicia indicates an access privilege level required for an access operation in connection with the page in the linear virtual address space, the access rights verifier verifying that the access privilege level indicated by said segmented to linear virtual address conversion instruction has a level required by the access privilege level indicated by the selected segmented to linear virtual address conversion descriptor.

8. A processor as defined in claim 5, the processor processing segmented to linear virtual address conversion instructions in connection with access operations of a plurality of selected access types, the access rights information in each said segmented to linear virtual address conversion instruction indicating the access type for which it is being processed, the access rights requirement indicia of each segmented to linear virtual address conversion descriptor indicating permitted access types for the segment page associated therewith, the access rights verifier verifying that the access rights information of the segmented to linear virtual address conversion instruction being processed indicates an access type which the access rights requirement indicia in the selected segmented to linear virtual address conversion descriptor indicates is permitted.

9. A processor as defined in claim 8 in which one of said access types is a storage operation, in which information is to be stored in the page of said linear virtual address space identified by the virtual address generated by said linear virtual address generator, the access rights information in each said segmented to linear virtual address conversion instruction indicating whether the access type is a storage operation and the access rights requirement indicia of each segmented to linear virtual address conversion descriptor indicating whether a storage operation is a permitted access type for the segment page associated therewith.

10. A processor as defined in claim 1 in which each segment in said segmented virtual address space is associated with one of a plurality of segment identifiers, each segmented to linear virtual address conversion descriptor includes a segment identifier value corresponding to the segment identifier for the segment comprising the segment page associated with the respective segmented to linear virtual address conversion descriptor, and further in which each segmented virtual address to be converted in response to said segmented to linear virtual address conversion instruction includes a segment identifier value, the processor further including a segment verifier for verifying that the segment identifier value included in said segmented to linear virtual address conversion instruction corresponds to the segment identifier value included in said segmented to linear virtual address conversion descriptor.

11. A processor as defined in claim 10 in which said processor further includes an exception handler for performing selected recovery operations if the segment verifier determines that the segment identifier value included in said segmented to linear virtual address conversion instruction does not correspond to the segment identifier value included in said segmented to linear virtual address conversion descriptor.

12. A processor as defined in claim 1 in which each segmented to linear virtual address conversion descriptor further comprises a length value identifying a length of the segment page associated therewith, and in which each segmented virtual address further includes an offset value identifying an offset into the segment page identified by said segmented virtual address, the processor further including a length verifier for verifying that the offset value included in said segmented virtual address is not greater than the length value included in said segmented to linear virtual address conversion descriptor.

13. A processor as defined in claim 12 in which said processor further includes an exception handler for performing selected recovery operations if the length verifier determines that the offset value included in said segmented virtual address is greater than the length value included in said segmented to linear virtual address conversion descriptor.

14. A processor as defined in claim 1 in which each segmented virtual address further includes an offset value identifying an offset into the segment page identified by said segmented virtual address, the linear virtual address generator using the offset value in generating said virtual address in said linear virtual address space.

15. A processor as defined in claim 14 in which said linear virtual address generator generates said virtual address in said linear virtual address space by concatenating the offset value from the segmented virtual address onto the page identifier of the linear virtual address space from the selected segmented to linear virtual address conversion descriptor.

16. A method of processing a segmented to linear virtual address conversion instruction to convert a segmented virtual address in a segmented virtual address space to a linear virtual address in a linear virtual address space, the segmented virtual address space comprising a plurality of segments, each segment comprising at least one segment page identified by a segmented page identifier, the linear virtual address space including a plurality of linear pages each identified by a linear page identifier, the method using a plurality of segmented to linear virtual address conversion descriptors, each associated with a segment page, each segmented to linear virtual address conversion descriptor identifying the page identifier of one of said linear pages, the segmented to linear virtual address conversion instruction identifying a segmented virtual address in said segmented virtual address space, the segmented virtual address identifying one of said segment pages, the method comprising the steps of:

A. selecting one of said segmented to linear virtual address conversion descriptors associated with one of said segment pages as identified by the segmented to linear virtual address conversion instruction; and B. using the page identifier of the linear virtual address space from the segmented to linear virtual address conversion descriptor selected by said segmented to linear virtual address conversion descriptor selector element and the segmented virtual address identifier in the segmented to linear virtual address conversion instruction to generate a virtual address in said linear virtual address space.

17. A method as defined in claim 16, in which a memory stores the segmented to linear virtual address conversion descriptors, the method further comprising the step of retrieving from the memory the selected use in generating said virtual address in said linear virtual address.

18. A method as defined in claim 17 in which a cache is provided for caching retrieved segmented to linear virtual address conversion descriptors, the method initially determining whether the cache contains a segmented to linear virtual address conversion descriptor associated with the segment page identified by the segmented to linear virtual address conversion instruction and, if so, selecting the segmented to linear virtual address conversion descriptor.

19. A method as defined in claim 18 in which, if the cache does not contain a segmented to linear virtual address conversion descriptor associated with the segment page identified by the segmented to linear virtual address conversion instruction, retrieval operation is initiated to retrieve from the memory the selected segmented to linear virtual conversion descriptor for use in generating said virtual address in said linear virtual address space.

20. A method as defined in claim 16 in which said segmented to linear virtual address conversion instruction is to be used in an access operation in connection with a page in the linear virtual address space, said segmented to linear virtual address conversion instruction including access rights information, and further in which each segmented to linear virtual address conversion descriptor includes access rights requirement indicia, the method further including the step of verifying that the access rights information in said segmented to linear virtual address conversion instruction conforms to the access rights requirement indicia.

21. A method as defined in claim 20 in which an exception handler performs selected recovery operations if it is determined that the access rights information in said segmented to linear virtual address conversion instruction does not conform to the access rights requirement indicia in said selected segmented to linear virtual address conversion descriptor.

22. A method as defined in claim 20 in which said access rights information in said segmented to linear virtual address conversion instruction indicates one of a plurality of access privilege levels, and said access rights requirement indicia indicates an access privilege level required for an access operation in connection with the page in the linear virtual address space, the access rights verification step verifying that the access privilege level indicated by said segmented to linear virtual address conversion instruction has a level required by the access privilege level indicated by the selected segmented to linear virtual address conversion descriptor.

23. A method as defined in claim 20, the segmented to linear virtual address conversion instructions being processed in connection with access operations of a plurality of selected access types, the access rights information in each said segmented to linear virtual address conversion instruction indicating the access type for which it is being processed, the access rights requirement indicia of each segmented to linear virtual address conversion descriptor indicating permitted access types for the segment page associated therewith, the access rights verification step verifying that the access rights information of the segmented to linear virtual address conversion instruction being processed indicates an access type which the access rights requirement indicia in the selected segmented to linear virtual address conversion descriptor indicates is permitted.

24. A method as defined in claim 23 in which one of said access types is a storage operation, in which information is to be stored in the page of said linear virtual address space identified by the virtual address generated by said linear virtual address generator, the access rights information in each said segmented to linear virtual address conversion instruction indicating whether the access type is a storage operation and the access rights requirement indicia of each segmented to linear virtual address conversion descriptor indicating whether a storage operation is a permitted access type for the segment page associated therewith.

25. A method as defined in claim 16 in which each segment in said segmented virtual address space is associated with one of a plurality of segment identifiers, each segmented to linear virtual address conversion descriptor includes a segment identifier value corresponding to the segment identifier for the segment comprising the segment page associated with the respective segmented to linear virtual address conversion descriptor, and further in which each segmented virtual address to be converted in response to said segmented to linear virtual address conversion instruction includes a segment identifier value, the method further including the step of verifying that the segment identifier value included in said segmented to linear virtual address conversion instruction corresponds to the segment identifier value included in said segmented to linear virtual address conversion descriptor.

26. A method as defined in claim 25 further including exception handler step in which selected recovery operations are performed if it is determined that the segment identifier value included in said segmented to linear virtual address conversion instruction does not correspond to the segment identifier value included in said segmented to linear virtual address conversion descriptor.

27. A method as defined in claim 16 in which each segmented to linear virtual address conversion descriptor further comprises a length value identifying a length of the segment page associated therewith, and in which each segmented virtual address further includes an offset value identifying an offset into the segment page identified by said segmented virtual address, the method further including the step of verifying that the offset value included in said segmented virtual address is not greater than the length value included in said segmented to linear virtual address conversion descriptor.

28. A method as defined in claim 27 in which an exception handler performs selected recovery operations if it is determined that the offset value included in said segmented virtual address is greater than the length value included in said segmented to linear virtual address conversion descriptor.

29. A method as defined in claim 16 in which each segmented virtual address further includes an offset value identifying an offset into the segment page identified by said segmented virtual address, the offset value being used in generating said virtual address in said linear virtual address space during said virtual address generating step.

30. A method as defined in claim 29 in which said virtual address in said linear virtual address space is generated by concatenating the offset value from the segmented virtual address onto the page identifier of the linear virtual address space from the selected segmented to linear virtual address conversion descriptor.

31. A segmented to linear virtual address conversion computer program product for controlling a processor to facilitate execution of a segmented to linear virtual address conversion instruction to convert a segmented virtual address in a segmented virtual address space to a linear virtual address in a linear virtual address space, the segmented virtual address space comprising a plurality of segments, each segment comprising at least one segment page identified by a segmented page identifier, the linear virtual address space including a plurality of linear pages each identified by a linear page identifier, the processor using a plurality of segmented to linear virtual address conversion descriptors, each associated with a segment page, each segmented to linear virtual address conversion descriptor identifying the page identifier of one of said linear pages, the segmented to linear virtual address conversion instruction identifying a segmented virtual address in said segmented virtual address space, the segmented virtual address identifying one of said segment pages, the segmented to linear virtual address conversion computer program product comprising a computer-readable medium having encoded thereon:

A. segmented to linear virtual address conversion descriptor selector code elements for enabling said processor to select one of said segment pages as identified by the segmented to linear virtual address conversion instruction; and B. linear virtual address generator code elements for enabling said processor to use the page identifier of the linear virtual address space from the segmented to linear virtual address conversion descriptor selected in response to processing under control of said segmented to linear virtual address conversion descriptor selector code elements and the segmented virtual address identifier in the segmented to linear virtual address conversion instruction to generate a virtual address in said linear virtual address space.

32. A computer program product as defined in claim 31, the processor being connected to a memory, the memory storing the segmented to linear virtual address conversion descriptors, the computer program product further comprising descriptor retrieval code elements for enabling said processor to retrieve from the memory the segmented to linear virtual conversion descriptor as selected during processing of said segmented to linear virtual address conversion descriptor code elements for use during processing of said linear virtual address generator code elements.

33. A computer program product as defined in claim 32 in which said processor further comprises a cache for caching segmented to linear virtual address conversion descriptors retrieved by said descriptor retrieval element, the segmented to linear virtual address conversion descriptor selector code elements enabling said processor to initially determine whether the cache contains a segmented to linear virtual address conversion descriptor associated with the segment page identified by the segmented to linear virtual address conversion instruction and, if so, select the segmented to linear virtual address conversion descriptor.

34. A computer program product as defined in claim 33 in which said segmented to linear virtual address conversion descriptor selector code elements enable said processor to, if it determines that the cache does not contain a segmented to linear virtual address conversion descriptor associated with the segment page identified by the segmented to linear virtual address conversion instruction, initiate a retrieval operation to retrieve from the memory the segmented to linear virtual conversion descriptor as selected during processing of said segmented to linear virtual address conversion descriptor code elements for use during processing of said linear virtual address generator code elements.

35. A computer program product as defined in claim 31 in which said segmented to linear virtual address conversion instruction is to be used in an access operation in connection with a page in the linear virtual address space, said segmented to linear virtual address conversion instruction including access rights information, and further in which each segmented to linear virtual address conversion descriptor includes access rights requirement indicia, the computer program product further including access rights verification code elements for enabling said processor to verify that the access rights information in said segmented to linear virtual address conversion instruction conforms to the access rights requirement indicia.

36. A computer program product as defined in claim 35 further including an exception handler for enabling said processor to perform selected recovery operations if the processor determines, during processing of said access rights verification code elements, that the access rights information in said segmented to linear virtual address conversion instruction does not conform to the access rights requirement indicia in said selected segmented to linear virtual address conversion descriptor.

37. A computer program product as defined in claim 35 in which said access rights information in said segmented to linear virtual address conversion instruction indicates one of a plurality of access privilege levels, and said access rights requirement indicia indicates an access privilege level required for an access operation in connection with the page in the linear virtual address space, the access rights verification code elements enabling said processor to verify that the access privilege level indicated by said segmented to linear virtual address conversion instruction has a level required by the access privilege level indicated by the selected segmented to linear virtual address conversion descriptor.

38. A computer program product as defined in claim 35, the processor processing segmented to linear virtual address conversion instructions in connection with access operations of a plurality of selected access types, the access rights information in each said segmented to linear virtual address conversion instruction indicating the access type for which it is being processed, the access rights requirement indicia of each segmented to linear virtual address conversion descriptor indicating permitted access types for the segment page associated therewith, the access rights verification code elements enabling said processor to verify that the access rights information of the segmented to linear virtual address conversion instruction being processed indicates an access type which the access rights requirement indicia in the selected segmented to linear virtual address conversion descriptor indicates is permitted.

39. A computer program product as defined in claim 38 in which one of said access types is a storage operation, in which information is to be stored in the page of said linear virtual address space identified by the virtual address generated by said linear virtual address generator, the access rights information in each said segmented to linear virtual address conversion instruction indicating whether the access type is a storage operation and the access rights requirement indicia of each segmented to linear virtual address conversion descriptor indicating whether a storage operation is a permitted access type for the segment page associated therewith.

40. A computer program product as defined in claim 31 in which each segment in said segmented virtual address space is associated with one of a plurality of segment identifiers, each segmented to linear virtual address conversion descriptor includes a segment identifier value corresponding to the segment identifier for the segment comprising the segment page associated with the respective segmented to linear virtual address conversion descriptor, and further in which each segmented virtual address to be converted in response to said segmented to linear virtual address conversion instruction includes a segment identifier value, the computer program product further including segment verification code elements for enabling said processor to verify that the segment identifier value included in said segmented to linear virtual address conversion instruction corresponds to the segment identifier value included in said segmented to linear virtual address conversion descriptor. conversion descriptor.

41. A computer program product as defined in claim 40 further including an exception handler for enabling said processor to perform selected recovery operations if it is determined that the segment identifier value included in said segmented to linear virtual address conversion instruction does not correspond to the segment identifier value included in said segmented to linear virtual address conversion descriptor.

42. A computer program product as defined in claim 31 in which each segmented to linear virtual address conversion descriptor further comprises a length value identifying a length of the segment page associated therewith, and in which each segmented virtual address further includes an offset value identifying an offset into the segment page identified by said segmented virtual address, the computer program product further including length verification code elements for enabling said processor to verify that the offset value included in said segmented virtual address is not greater than the length value included in said segmented to linear virtual address conversion descriptor.

43. A computer program product as defined in claim 42 further including an exception handler for performing selected recovery operations if it is determine that the offset value included in said segmented virtual address is greater than the length value included in said segmented to linear virtual address conversion descriptor.

44. A computer program product as defined in claim 31 in which each segmented virtual address further includes an offset value identifying an offset into the segment page identified by said segmented virtual address, the linear virtual address generator code elements enabling said processor to use the offset value in generating said virtual address in said linear virtual address space.

45. A computer program product as defined in claim 44 in which said linear virtual address generator code elements enable said processor to generates said virtual address in said linear virtual address space by concatenating the offset value from the segmented virtual address onto the page identifier of the linear virtual address space from the selected segmented to linear virtual address conversion descriptor.

* * * * *